United States Patent

Skog et al.

(10) Patent No.: US 9,344,481 B2
(45) Date of Patent: *May 17, 2016

(54) SYSTEM AND METHOD FOR ADAPTING INFORMATION CONTENT ACCORDING TO THE CAPABILITY OF THE ACCESS BEARER

(71) Applicant: Optis Wireless Technology, LLC, Plano, TX (US)

(72) Inventors: Robert Bengt Skog, Hasselby (SE); Staffan Pehrson, Danderyd (SE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,073

(22) Filed: Oct. 6, 2014

(65) Prior Publication Data

US 2015/0026300 A1 Jan. 22, 2015
US 2016/0088061 A9 Mar. 24, 2016

Related U.S. Application Data

(63) Continuation of application No. 10/337,198, filed on Jan. 6, 2003, now Pat. No. 8,856,358, which is a continuation of application No. PCT/SE01/01564, filed on Jul. 6, 2001.

(51) Int. Cl.

| *G06F 15/16* | (2006.01) |
| *H04L 29/08* | (2006.01) |
| *G06F 17/30* | (2006.01) |
| *H04L 29/06* | (2006.01) |

(Continued)

(52) U.S. Cl.
CPC .......... *H04L 67/04* (2013.01); *G06F 17/30905* (2013.01); *H04L 29/06* (2013.01); *H04L 41/28* (2013.01); *H04L 67/06* (2013.01); *H04W 4/18* (2013.01); *H04W 8/183* (2013.01); *H04W 80/00* (2013.01); *H04W 80/12* (2013.01); *H04L 69/329* (2013.01)

(58) Field of Classification Search
CPC ......... H04L 67/04; H04L 41/28; H04L 67/06; H04W 8/183; H04W 80/00; H04W 80/12; H04W 4/18; G06F 17/30905
USPC ........... 709/218–219, 216, 217; 370/340, 405
See application file for complete search history.

(56) References Cited

U.S. PATENT DOCUMENTS

| 5,905,872 | A | 5/1999 | DeSimone et al. | |
| 6,343,318 | B1 * | 1/2002 | Hawkins ............. | G06F 17/3089 707/E17.116 |

(Continued)

FOREIGN PATENT DOCUMENTS

| JP | H10150470 A | 6/1998 |
| JP | H11288403 A | 10/1999 |
| WO | 9819438 A1 | 5/1998 |

*Primary Examiner* — Thu Ha Nguyen
(74) *Attorney, Agent, or Firm* — Vincent J. Allen; James H. Ortega; Carstens & Cahoon, LLP

(57) ABSTRACT

A communication system is adapted to provide access to application information on an application server utilizing a specific one of multiple radio access types. Access is provided via an access network using an access bearer. The capability of the specifically requested access bearer is sent to the application server to tailor the application information content according to the capability of the specific access bearer. The information content is then transmitted to the requesting device.

20 Claims, 3 Drawing Sheets

(51) Int. Cl.
  *H04W 4/18* (2009.01)
  *H04W 8/18* (2009.01)
  *H04W 80/00* (2009.01)
  *H04L 12/24* (2006.01)
  *H04W 80/12* (2009.01)

(56) References Cited

U.S. PATENT DOCUMENTS

| | | | |
|---|---|---|---|
| 6,970,183 B1 * | 11/2005 | Monroe | 348/143 |
| 7,657,741 B2 * | 2/2010 | Adams | H04L 12/58 |
| | | | 713/166 |
| 7,725,711 B2 * | 5/2010 | Brown | G06Q 20/3821 |
| | | | 705/76 |
| 8,032,409 B1 * | 10/2011 | Mikurak | 705/14.39 |
| 8,065,357 B2 * | 11/2011 | Cocotis | G06F 3/1292 |
| | | | 358/1.15 |
| 8,645,456 B2 * | 2/2014 | Li | H04W 4/18 |
| | | | 709/202 |
| 9,203,912 B2 * | 12/2015 | Krishnaswamy | G06Q 30/02 |
| 2002/0082015 A1 * | 6/2002 | Wu | 455/436 |
| 2003/0229900 A1 * | 12/2003 | Reisman | 725/87 |
| 2005/0060411 A1 * | 3/2005 | Coulombe et al. | 709/227 |
| 2005/0232284 A1 * | 10/2005 | Karaoguz | H04L 12/66 |
| | | | 370/401 |
| 2007/0206573 A1 * | 9/2007 | Silver | 370/352 |
| 2007/0243872 A1 * | 10/2007 | Gallagher | H04W 76/022 |
| | | | 455/436 |
| 2007/0281687 A1 * | 12/2007 | Jiang | 455/433 |
| 2007/0283048 A1 * | 12/2007 | Theimer et al. | 709/246 |
| 2007/0293216 A1 * | 12/2007 | Jiang | 455/433 |
| 2008/0217551 A1 * | 9/2008 | Zhang | G01T 7/00 |
| | | | 250/390.03 |
| 2009/0313318 A1 * | 12/2009 | Dye et al. | 709/202 |
| 2011/0286387 A1 * | 11/2011 | Sane | H04L 1/1685 |
| | | | 370/328 |
| 2012/0069750 A1 * | 3/2012 | Xing | H04W 72/0486 |
| | | | 370/252 |
| 2013/0196698 A1 * | 8/2013 | Lee et al. | 455/466 |
| 2014/0082068 A1 * | 3/2014 | Lv et al. | 709/204 |
| 2014/0096667 A1 * | 4/2014 | Chapman et al. | 84/609 |
| 2014/0362807 A1 * | 12/2014 | Bhatnagar et al. | 370/329 |
| 2015/0012931 A1 * | 1/2015 | Ortiz et al. | 725/25 |
| 2015/0181640 A1 * | 6/2015 | Kwong | H04W 1/1685 |
| | | | 370/329 |
| 2015/0304939 A1 * | 10/2015 | Liu | H04W 8/22 |
| | | | 370/232 |
| 2015/0327053 A1 * | 11/2015 | Zhou | H04W 24/02 |
| | | | 370/328 |

* cited by examiner

SYSTEM AND METHOD FOR ADAPTING INFORMATION CONTENT ACCORDING TO THE CAPABILITY OF THE ACCESS BEARER

CLAIM OF PRIORITY

This disclosure is a continuation of, and thus claims priority to, U.S. application Ser. No. 10/337,198, filed Jan. 6, 2003, which claims priority under 35 U.S.C. §120 to PCT application serial no. PCT/SE01/01564 filed on Jul. 6, 2001 and Swedish application serial no. 0002572-6 filed on Jul. 7, 2000.

BACKGROUND

1. Technical Field of the Invention

The present invention relates in general to a communication system and in particular to a wireless communication system. More particularly, the present invention relates to a communication system with more than one type of radio access.

2. Description of the Related Art

In the mobile Internet world, users may have more than one type of radio access available to connect to an application server. Radio accesses (access bearers) to applications on the Internet that may be available to a user include: Short Message Service (SMS), Unstructured Supplemental Service Data (USSD), Circuit Switched Data (CSD), General Bluetooth™ Packet Radio Services (GPRS), Universal Mobile Telephone System (UMTS) and Bluetooth™ (a short range, high frequency communication protocol). Each of these access bearers has different attributes or capabilities including transmission speed (bandwidth).

Wireless Application Protocol (WAP) is a technology that enables wireless access to Internet applications from a wireless terminal (cell phone, wireless modem, etc.) The WAP Forum, a nonprofit organization formed for administering the WAP Specification process, has defined a WAP architecture for pulling information from the Internet (Internet browsing) and pushing (application initiated) information (sending news messages, mail notification, etc.) to a user.

The WAP Forum, in its Wireless Application Environment (WAE), has adopted an application framework for access to the Internet by wireless terminals such as mobile phones, pagers and Personal Digital Assistants (PDAs). This specification closely follows the World Wide Web (WWW) model. All content is specified in formats that are similar to standard Internet formats. Content may be transported using standard protocols in the WWW domain and an optimized HTTP-like protocol in the wireless domain such as the Wireless Session Protocol (WSP), a WAP communication protocol.

A mobile phone may initiate a data call in the GSM network, in a packet switched data network like the General Packet Radio Services (GPRS), or the Universal Mobile Telephone System (UMTS) which is the standard for the next generation mobile telephone system in Europe. There is also the possibility to use short-range radio access technology like Bluetooth™.

FIG. 1 illustrates a communication system in which a wireless terminal may establish connection to an application server via a WAP Gateway and an IP network utilizing one of many access bearers (e.g. Bluetooth™, GSM, GPRS or UMTS). Mobile phone 102 can connect to an Application Server 114 using Wireless Application Protocol (WAP) Gateway 114 via one of several types of access technology.

In FIG. 1, Application Server 116 is connected to WAP Gateway 114 via a LAN (not shown) or via an Internet Protocol (IP) network (not shown) and WAP Gateway 114 may in turn be connected to mobile phone 102 via IP network 112. The protocol used by WAP Gateway 114 to reach applications residing in Application Server 116 may be accomplished by using Hypertext Transfer Protocol (HTTP), a well-known and established standard protocol for transporting hypertext documents around the Internet.

Application Server 116 is not aware of the bearer type by which the mobile phone 102 gained access. However, if the bearer type that is used is not according to preferred access means, there could be reduced capability of the connection. For example, if mobile phone 102 was connected using an SMS bearer connection and a WAP page is selected that was designed for CSD (9.6 Kbps), the downloading time for the page may be too long and inconvenient for the end user.

FIG. 2 depicts a high-level block diagram of a GSM and UMTS network with typical coverage for radio accesses in a mobile network. In a Public Land Mobile Network (PLMN) different access types co-exist and will typically be unevenly deployed in the network at any given time. An operator that has GSM coverage and is in the process of introducing GPRS will start introducing GPRS in selected areas first, such as cities. The same procedure will likely be followed when introducing a next generation mobile system, e.g., UMTS. The reason for gradually introducing access bearers into a PLMN that have higher capacity is generally related to cost because of the necessary investment in infrastructure Mobile phones may move around in the PLMN area and, depending on the radio access availability, be able to use different access bearers (for simplicity, only Bluetooth™ is illustrated here). Another aspect regarding the choice of bearer, except for different downloading times, is related to the different costs for using different bearers, i.e., it may be cheaper to implement one access bearer before another bearer.

A drawback with communication systems used today is that the information about the bearer may not be known to the application, for example, when using WAP. One object of the present invention is to increase and optimize a user's accessibility of application information, including reducing download time for the user. Another object of the present invention is to provide a communication system that identifies the access bearer capability to the application.

SUMMARY

A mobile phone may use different bearers, e.g. GPRS, Circuit Switched Data (CSD), SMS/USSD (via GSM), etc., and the same bearer may use different transmission speeds depending on available channels at the moment access is requested. In order for the application on the server to know the capability of the bearer that is used in the radio access, that capability must be recognized and forwarded to the application server.

Information regarding the capability (characteristics, parameters) of a particular access bearer is attached to a request message and sent to the application server. The present invention makes it possible for an application to tailor the accessed information content according to the capability of the bearer that is utilized for the specific access.

In order to provide the user with a valuable service, the application has to adapt to the capability of the bearer that is used for the access. Adaptation can mean that the information formatting is adjusted to the bearer capabilities or even that the information itself is adjusted. An example of the latter case is an application that only sends a summary of world news to a mobile phone rather than extensive articles.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION

In the following description, for purposes of explanation and not limitation, specific details are set forth, such as particular architectures, interfaces, circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logic code (e.g., hardware, software, firmware, etc.), etc., are omitted so as not to obscure the description of the present invention with unnecessary detail.

Figure 1:
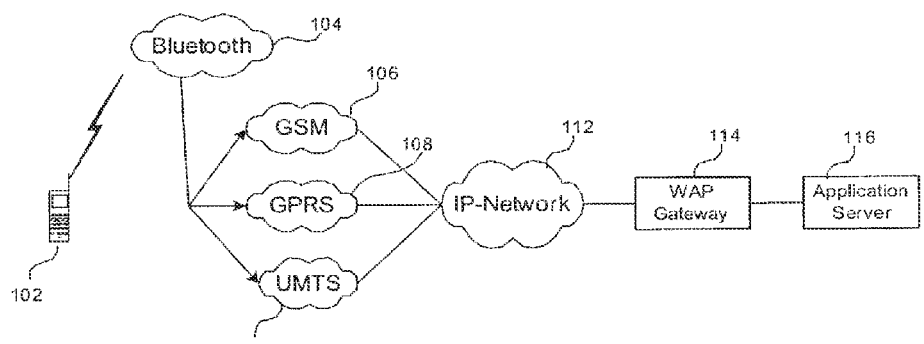
FIG. 1 illustrates a high-level block diagram of a telecommunications system.
Figure 2:
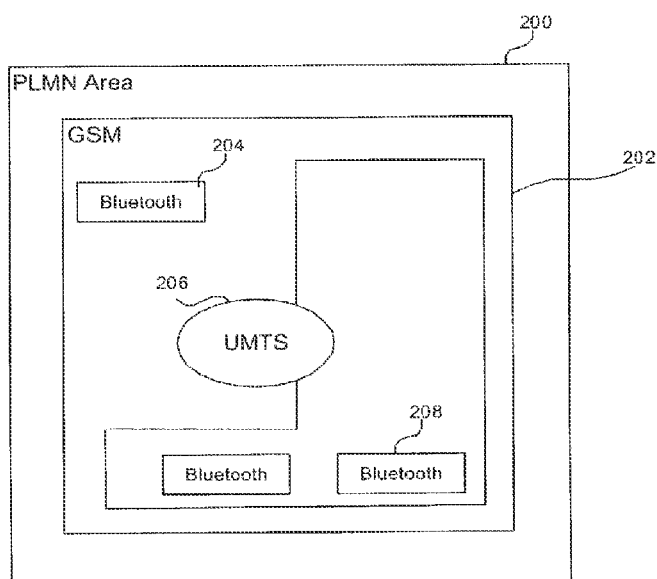
FIG. 2 depicts a high-level block diagram of GSM and UMTS coverage for Bluetooth™ radio access in a mobile network.
Figure 3:
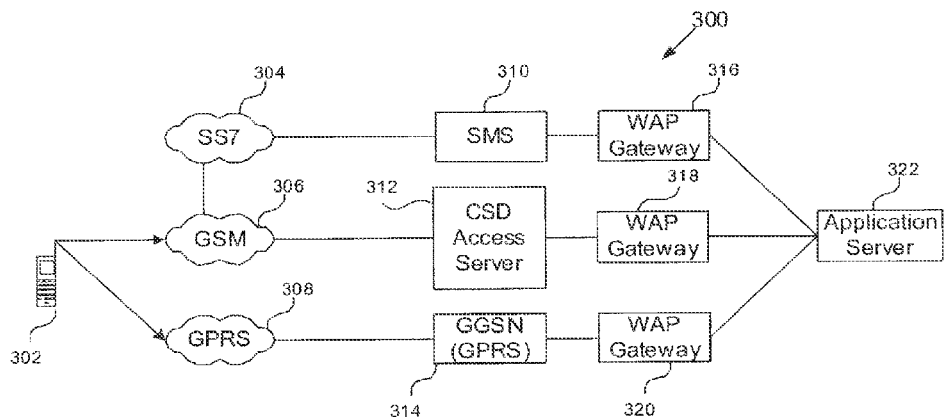
FIG. 3 illustrates a high-level block diagram of a telecommunications system according to a preferred embodiment of the present invention

A preferred embodiment of the present invention and its advantages are best understood by referring to FIGS. 1-5 of the drawings. With reference now to the figures, FIG. 3 illustrates a high-level block diagram of a telecommunications system according to a preferred embodiment of the present invention. The embodiment shown in FIG. 3 discloses three examples of access bearers, each being provided with a WAP Gateway especially designed for the capability for the respective access bearer. In FIG. 3, Short Message Service (SMS) server 310 is connected to mobile phone 302 via Signaling System No. 7 (SS7) 304, a protocol for signaling, and GSM network 306 in accordance with established technique. CSD Access Server 312 and Gateway GPRS Support Node (GGSN) server 314 are connected to mobile phone 302 via GSM network 306 and GPRS network 308, respectively, also in accordance with established technique. The number of WAP Gateways is limited to three for the sake of clarity and simplification of disclosure. Generally, the number of WAP Gateways that are utilized equals the number of different active access bearers.

The capability of an access bearer includes a parameter regarding the transmission speed used by that bearer. Other parameters that are related to the transmission may also be included in the capability information.

The term "terminal" will be used hereinafter to describe a device that is adapted to initiate an information request to an application server and to receive the requested information. In the description of a preferred embodiment the terminal is exemplified by mobile phone 302. However, any device provided with means for generating such an information request may be used as a terminal such as a laptop computer, a mobile phone and any hand-held device that is adapted for wirelessly connecting to an application server.

In the present invention, there is one gateway assigned to each type of access bearer. By having one gateway per access bearer, the different gateways would know the capability of the access bearer it is serving. However, if the designated access bearer is capable of using different speeds, the actual transmission speed may not be known since the speed may be decided at the terminal.

Mobile phone 302 may initiate a request (WAP or HTTP request) to the application server via a particular access bearer and the gateway allocated to the access bearer. When the request passes through the gateway, the capability of the access bearer may be attached to the request. This can be done, for example, by using a cookie in the header of the request. If the request was a WAP request, prior to appending the capability of the access bearer, the request is transformed into an HTTP request. Then, the WAP Gateway appends the capability of the access bearer in an HTTP header of the HTTP request.

Example of a HTTP Header:
Cookie: Access-Bearer-Type="(bearer)";
where "bearer" is the type of access, i.e., SMS, USSD, CSD-9.6, CSD-14.4, GPRS, UMTS or Bluetooth™. The HTTP request is then sent to the Application Server.

The requested application server extracts the Access-Bearer-Type cookie from the HTTP header according to well-known HTTP programming technique. The requested application may then be tailored in response to the capability information of the access bearer to achieve an optimized transmission to the terminal requesting the application information.

Figure 4:
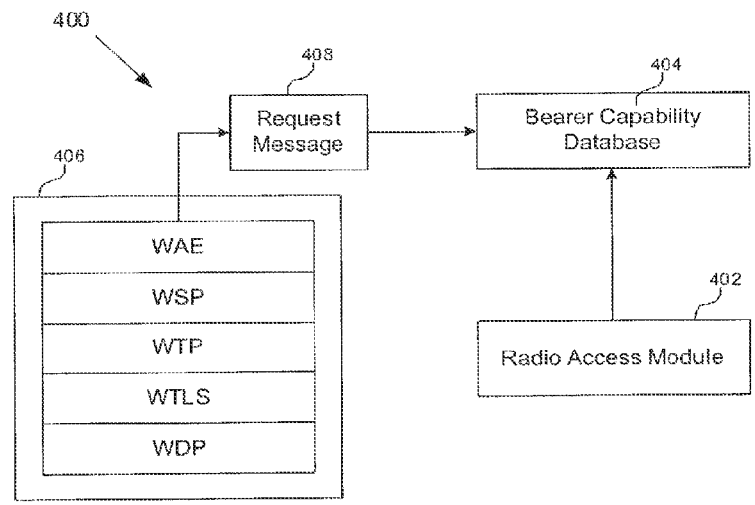
FIG. 4 depicts a block diagram of a wireless terminal in accordance with a preferred embodiment of the present invention.

FIG. 4 depicts a block diagram of a wireless terminal in accordance with a preferred embodiment of the present invention. Terminal 400 comprises Radio Access Module (RAM) 402, Bearer Capability Database (BCD) 404 and WAP User Agent 406. If terminal 400 is capable of using HTTP directly, the WAP gateway (not shown) may be replaced with an HTTP proxy server.

Radio Access Module 402 is able to detect the type of access bearer that terminal 400 uses based upon frequencies and number of time slots in the radio link. This access bearer type information is continuously interpreted in RAM 402. By interpreting frequencies, number of time slots and type of radio channel used RAM 402 calculates transmission speed and continuously writes the transmission speed into memory storage (not shown) in BCD 404. At each request, the current necessary information in BCD 404 is appended to request message 408. If terminal 400 is already connected to an application server (not shown) and a change in the bearer access capabilities occurs, terminal 400 is informed and RAM 402 interprets the change in capabilities and writes it continuously into the BCD 404. This new information is then appended into the next WAP request (or HTTP request).

WAP User Agent 406 comprises a number of protocol layers. An alternative to a WAP user agent would be to directly use an HTTP client in the terminal. The different layers in WAP User Agent 406 are: Wireless Application Environment (WAE), Wireless Session Protocol (WSP), Wireless Transaction Protocol (WTP), Wireless Transport Layer Security (WTLS) and Wireless Datagram Protocol. (WDP). When an application request (information request) is initiated WAP User Agent 406 (may also be an HTTP client) is arranged to make a WAP request (or HTTP request) to an application on the application server via the WAP protocol (or HTTP protocol) and the relevant capability of the access bearer is determined identified in Bearer Capability Database 404. The capability retrieved from BCD 404 is then appended to the WAP request (HTTP request) in a WAP header (or HTTP header). A WAP header will have the same look as the previously described HTTP header, but can be binary encoded.

When the application server has received information concerning the capability of the access bearer being used by a terminal, the requested application is adapted to tailor the application information to be transmitted to the accessing user. This may be performed in many different ways, e.g. the information formatting is adjusted to the bearer capabilities or even that the information itself is adjusted. An example of the latter case is an application that only sends a summary of world news to a mobile phone rather than extensive articles. Another example of adjusting the information is to filter out images from a newspaper article and only send the text information.

Figure 5:
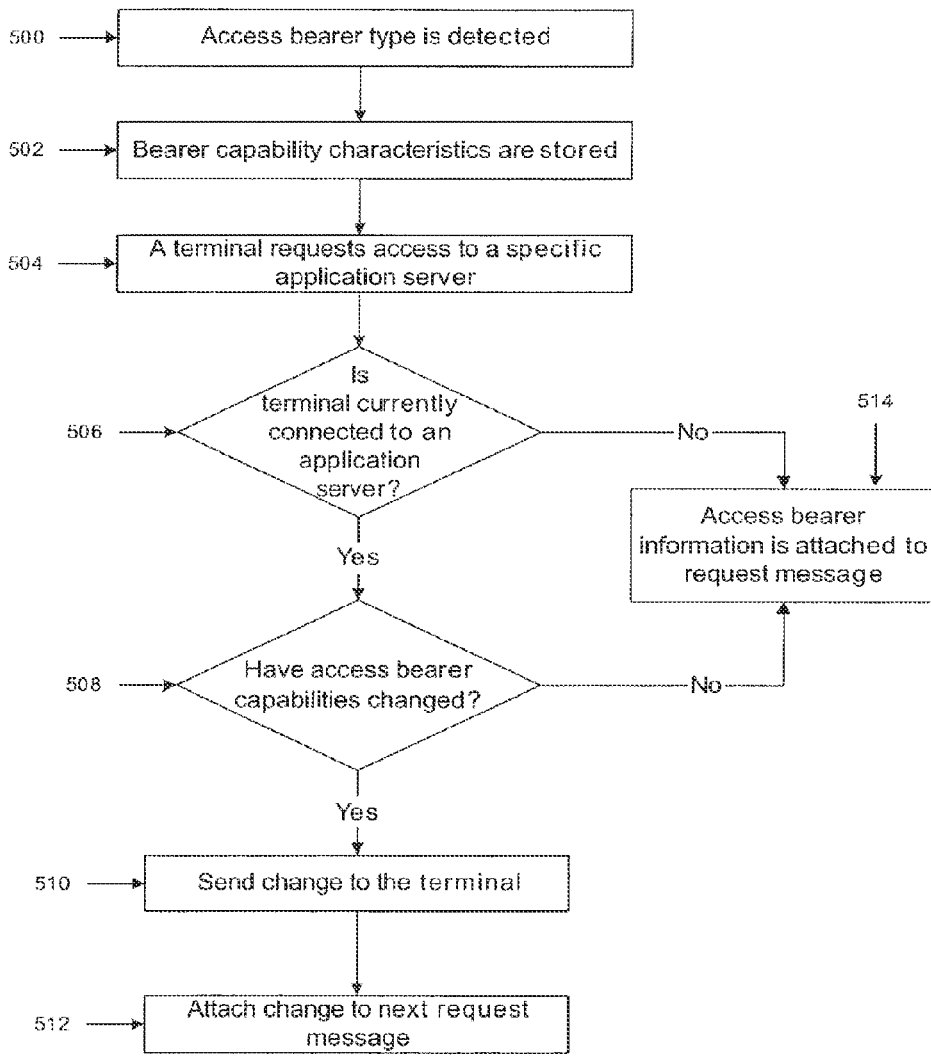
FIG. 5 illustrates a high-level flow diagram for accessing application information in an application server in accordance with a preferred embodiment of the present invention.

FIG. 5 illustrates a high-level flow diagram of a method for accessing application information in an application server in accordance with a preferred embodiment of the present invention. The process begins when a specific access bearer is detected (step 500). The capabilities of the access bearer, including bandwidth (transmission speed) are stored in memory (capability information may be stored in terminal memory) (step 502). When a terminal requests a specific application utilizing the access bearer, the information stored in memory is retrieved (step 504).

A determination is made of whether the terminal is currently connected to an application server containing the requested application (step 506). If the terminal is not currently connected, the access bearer information is attached to the request message and the message is transmitted to the application server containing the requested application (step 514). If the terminal is currently connected to an application server containing the requested application, a determination is made whether the bearer capabilities have changed (step 508). If there is no change, the access bearer information is attached to the request message and the message is transmitted to the application server (step 514).

If there is a change in the characteristics of the access bearer, the change is stored in a memory. In the case where the terminal attaches the access bearer information (see FIG. 4), the change is sent to the terminal and stored in a database in the terminal (step 510). The change may then be attached to the next request message depending on the timing of the next request (step 512).

The present invention monitors the different access bearers that are connected to an application server. Capabilities (characteristics) of the individual access bearers are detected and stored in a database as the capabilities change. A wireless terminal may make a request for access to an application residing on an application server that is accessible by the aforementioned access bearers. The present invention retrieves the current bearer information from the database and, after any necessary conversion, attaches the information to a request message. The message is sent to the respective application server and the application utilizes the attached information to tailor the response for subsequent transmittal to the terminal.

Those skilled in the art should readily appreciate that the present invention is capable of numerous rearrangements, modifications, and substitutions without departing from the spirit and scope of the present invention as set forth and defined by the following claims.

What is claimed is:

1. A method of operating a terminal in a wireless communication system, said terminal adapted to be wirelessly connected to at least one access device, each of said at least one access device arranged to provide wireless access over a type of access bearer, each access bearer having a bearer capability, wherein the method comprises:
   initiating an information request to an application server, wherein the terminal comprises a memory storage adapted to store information about the bearer capability for an access bearer used for conveying communication between the terminal and the at least one access device;
   identifying said information about the bearer capability in said memory storage;
   appending said information about the bearer capability to the initiated information request;
   transmitting the information request to the application server; and
   receiving the requested information from the application server, the requested information tailored depending on the information about bearer capability for the access bearer used for conveying communication between the terminal and the at least one access device.

2. The method of claim 1, further comprising collecting information regarding the used access bearer.

3. The method of claim 2, wherein the terminal further comprises a database, the method further comprising interpreting the collected information, and writing the interpreted information into the database.

4. The method of claim 1, wherein the appending comprises appending the information about bearer capability to a WAP request or an HTTP request.

5. The method of claim 4, further comprising identifying the information about bearer capability from the database, and appending the information about bearer capability to the WAP request or HTTP request.

6. The method of claim 1, wherein the information about bearer capability includes parameters regarding the transmission speed used by the access bearer used for conveying the information request.

7. A gateway in a wireless communication system, said gateway connected to an access device arranged to provide wireless access to a terminal over a type of access bearer, said access bearer having a bearer capability, the gateway further being connected to an application server, wherein the gateway is configured to:
   receive an information request from the terminal via an access bearer and the access device;
   append to the information request, information about bearer capability for the access bearer used for conveying the information request; and
   send the received information request with the appended information about bearer capability to the application server.

8. The gateway of claim 7, wherein the information request is a WAP request or an HTTP request.

9. The gateway of claim 7, wherein the gateway is further configured to receive the requested information from the application server, the requested information tailored depending on the information about bearer capability for the access bearer used for conveying communication between the terminal and the at least one access device.

10. The gateway of claim 9, wherein the gateway is further configured to transmit the received requested information to the terminal.

11. The gateway of claim 7, wherein the information about bearer capability includes parameters regarding the transmission speed used by the access bearer used for conveying the information request.

12. A method of operating a gateway in a wireless communication system, said gateway connected to an access device arranged to provide wireless access to a terminal over a type of access bearer, and connected to an application server, the method comprising:
   receiving an information request from the terminal via an access bearer and the access device, said access bearer having a bearer capability;
   appending to the information request, information about bearer capability for the access bearer used for conveying the information request; and
   sending the received information request with the appended information about bearer capability to the application server.

13. The method of claim 12, wherein the information request is a WAP request or an HTTP request.

14. The method of claim 12, further comprising receiving, by the gateway, the requested information from the application server, wherein the requested information is tailored depending on the information about bearer capability for the access bearer used for conveying communication between the terminal and the at least one access device.

15. The method of claim 12, further comprising transmitting the received requested information to the terminal.

16. A method of operating an application server in a wireless communication system, the method comprising:
   receiving an information request from a terminal via an access bearer and its associated access device, said access bearer having a bearer capability; and
   providing access to requested information to the terminal in response to the received information request by:
      extracting from the information request, information about bearer capability for the access bearer used for conveying the information request, said information about bearer capability being appended to the information request;
      tailoring the requested information depending on the information about bearer capability for the access bearer used for conveying the information request.

17. The method of claim 16, wherein the information request is a WAP request or an HTTP request.

18. The method of claim 16, wherein the bearer capability includes parameters regarding transmission speed of said access bearer.

19. The method of claim 16, wherein receiving an information request further comprises receiving an information request via a gateway connected to said access device.

20. The method of claim 19, wherein providing access to requested information further comprises providing access via said gateway.

\* \* \* \* \*